United States Patent
Nito

(10) Patent No.: US 9,873,262 B2
(45) Date of Patent: Jan. 23, 2018

(54) DRIVING DEVICE OF ROTATING POLYGONAL MIRROR AND IMAGE FORMING APPARATUS INCLUDING THE DRIVING DEVICE

(71) Applicant: CANON KABUSHIKI KAISHA, Tokyo (JP)

(72) Inventor: Yuta Nito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/471,941

(22) Filed: Aug. 28, 2014

(65) Prior Publication Data

US 2015/0062676 A1 Mar. 5, 2015

(30) Foreign Application Priority Data

Sep. 4, 2013 (JP) .................. 2013-183172

(51) Int. Cl.
*B41J 2/47* (2006.01)
*G02B 26/12* (2006.01)
*G03G 15/043* (2006.01)

(52) U.S. Cl.
CPC ............ *B41J 2/471* (2013.01); *G02B 26/122* (2013.01); *G03G 15/043* (2013.01)

(58) Field of Classification Search
CPC .......... B41J 2/442; B41J 2/471; G02B 26/122
See application file for complete search history.

(56) References Cited

U.S. PATENT DOCUMENTS

| | | | |
|---|---|---|---|
| 7,345,695 B2 | 3/2008 | Suzuki | |
| 7,365,765 B2 | 4/2008 | Dan | |
| 8,259,150 B2 | 9/2012 | Kubo | |
| 2005/0248648 A1* | 11/2005 | Suzuki | G02B 26/127 347/116 |
| 2008/0024851 A1* | 1/2008 | Sakaue | G02B 26/127 359/216.1 |
| 2011/0242259 A1* | 10/2011 | Kubo | B41J 2/471 347/224 |
| 2013/0106972 A1* | 5/2013 | Shumiya | B41J 2/471 347/118 |
| 2013/0235143 A1* | 9/2013 | Itami | G02B 26/127 347/224 |

FOREIGN PATENT DOCUMENTS

| | | |
|---|---|---|
| JP | 2006-142716 A | 6/2006 |
| JP | 2007-78723 A | 3/2007 |
| JP | 2011-148142 A | 8/2011 |
| JP | 2012-11632 A | 1/2012 |
| JP | 2013-3164 A | 1/2013 |

* cited by examiner

Primary Examiner — Kristal Feggins
Assistant Examiner — Kendrick Liu
(74) Attorney, Agent, or Firm — Canon U.S.A., Inc. IP Division

(57) ABSTRACT

A driving device of a rotating polygonal mirror which stops supply of a driving current or reduces output of the driving current in a state where the driving current is supplied to a driving motor, and detects a period of an FG signal based on a detected waveform output from a detection element in the state where the driving current is stopped.

8 Claims, 13 Drawing Sheets

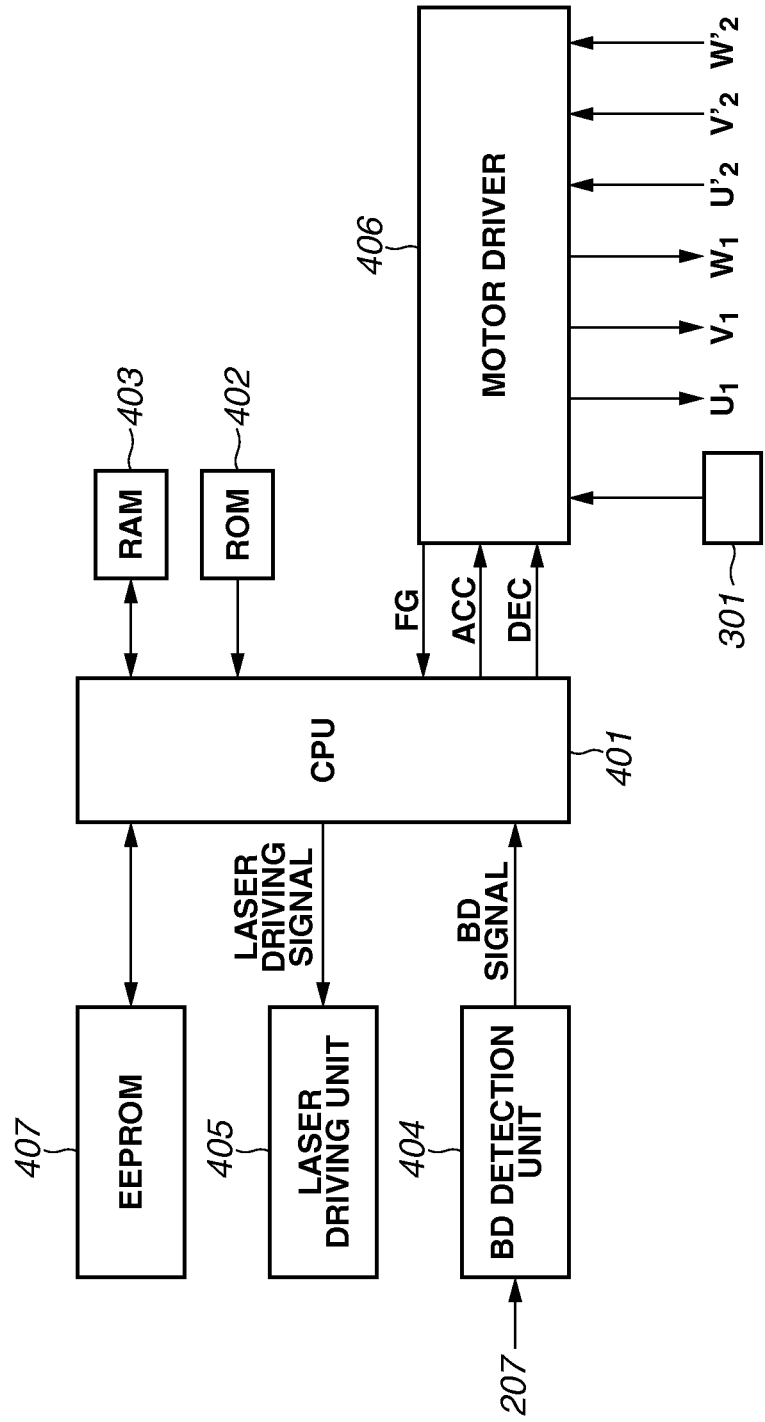

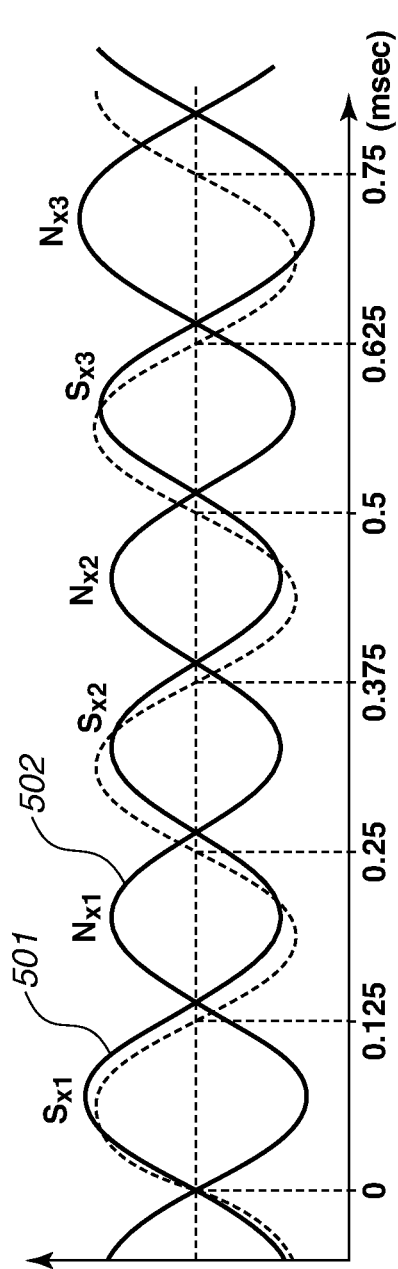
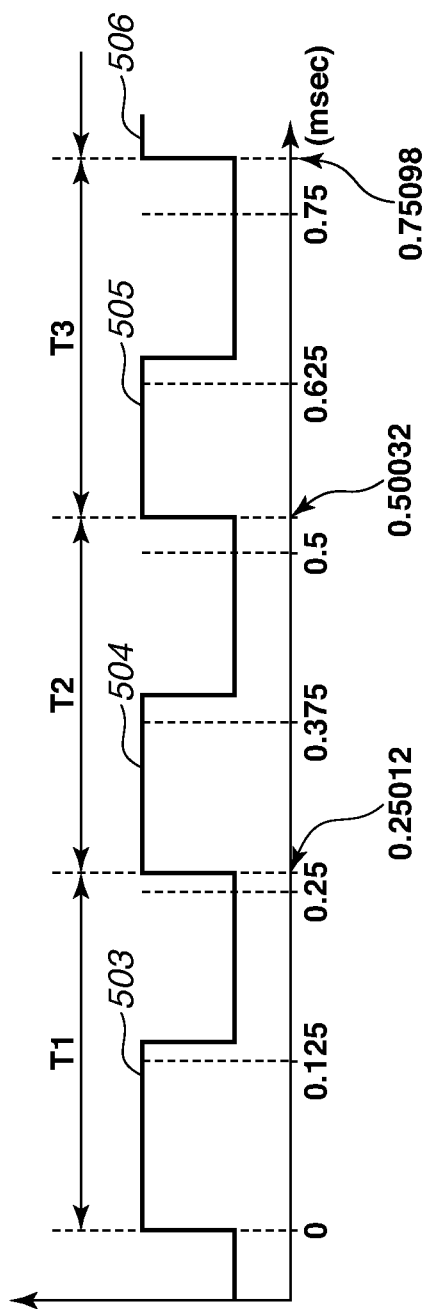
FIG.5A
FIG.5B

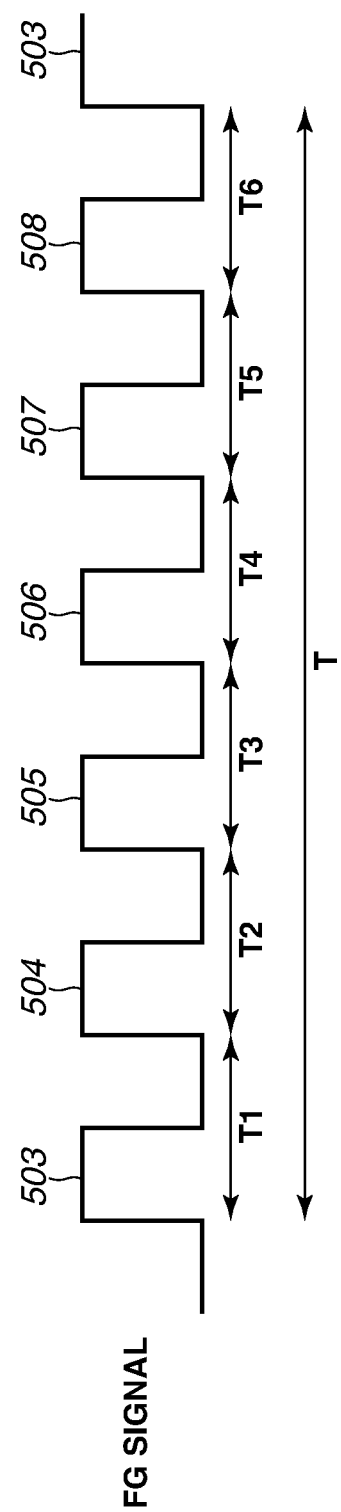

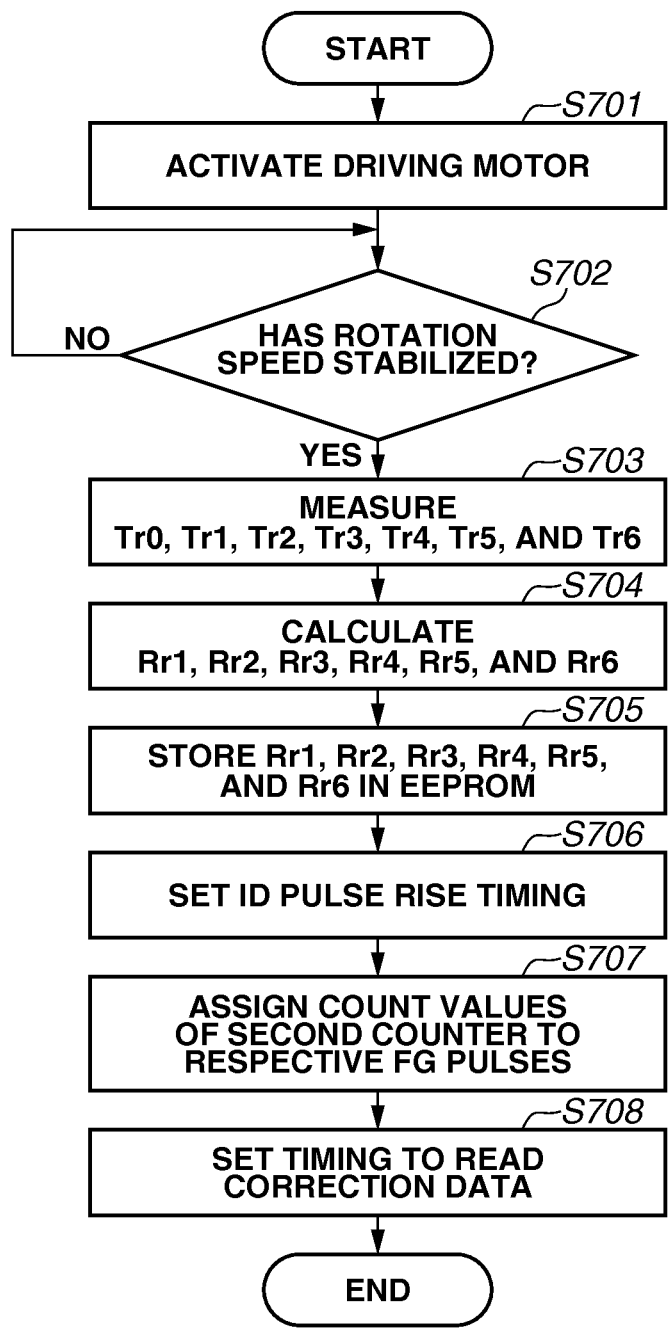

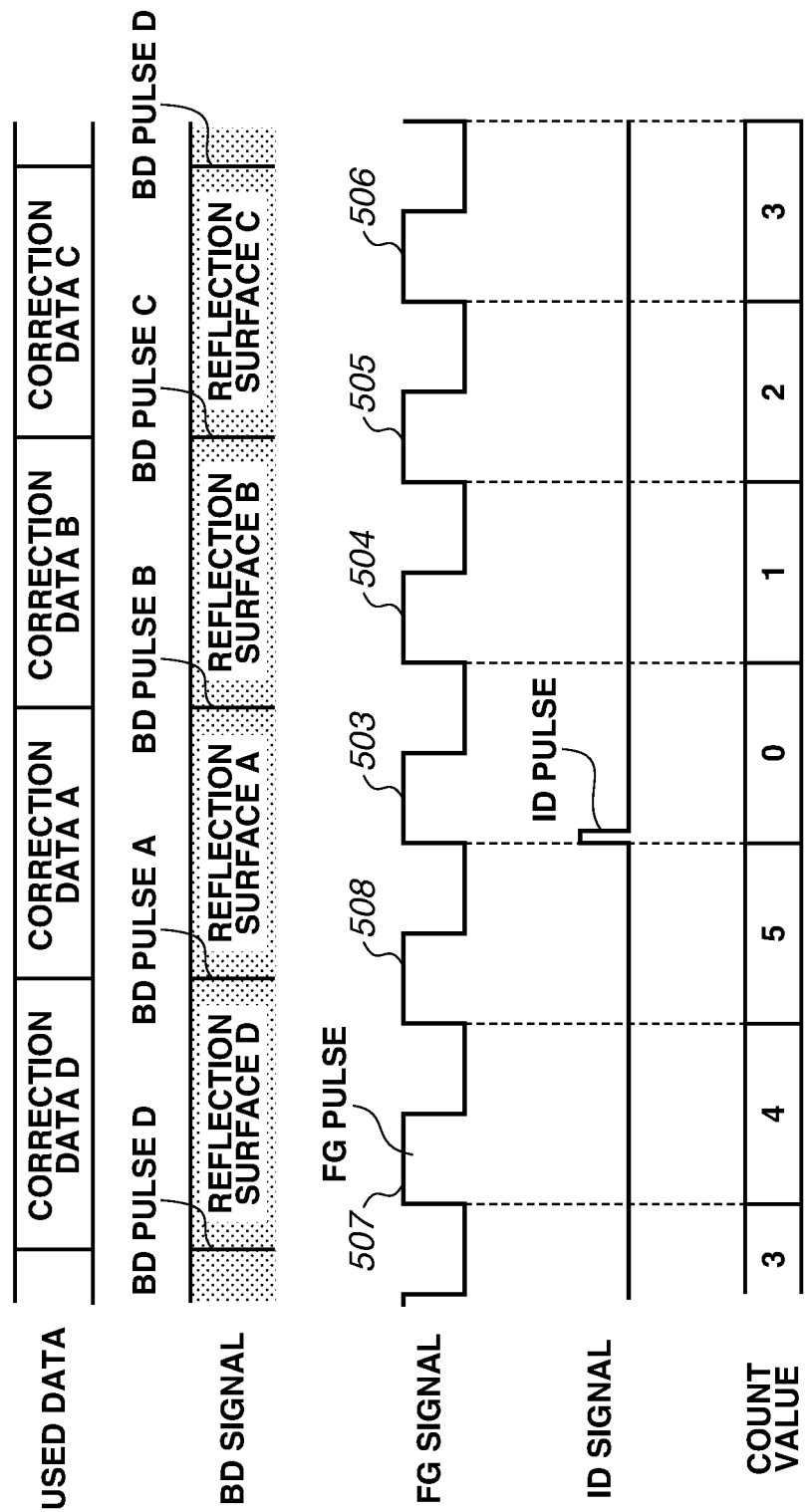

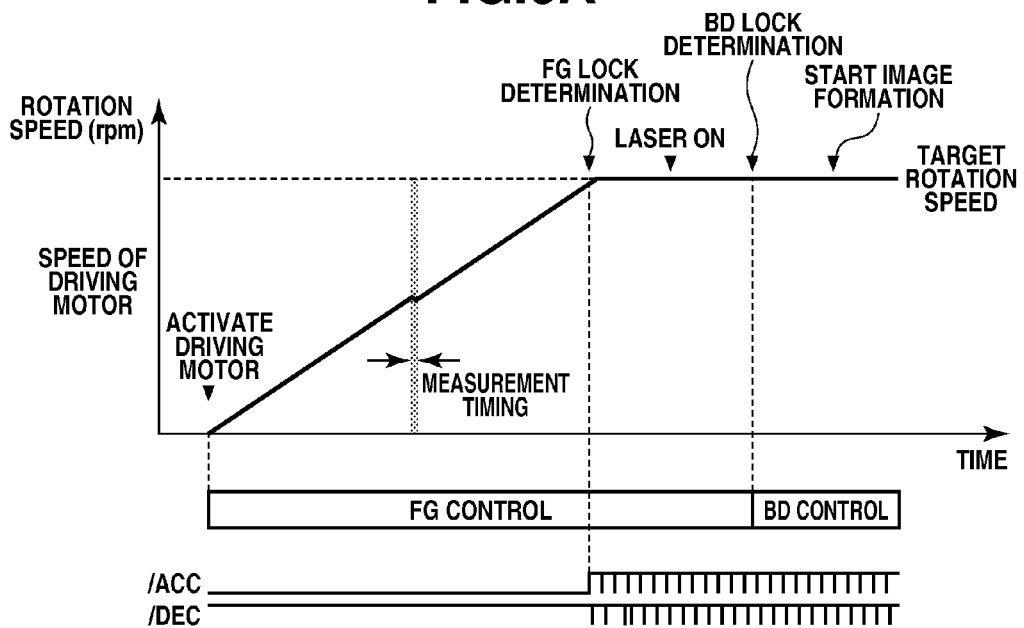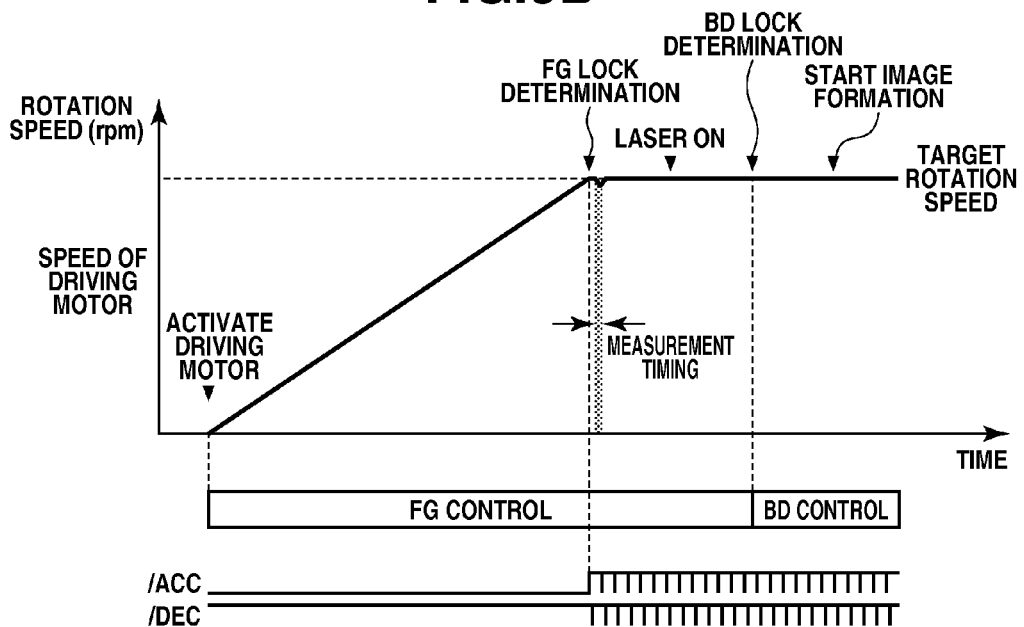

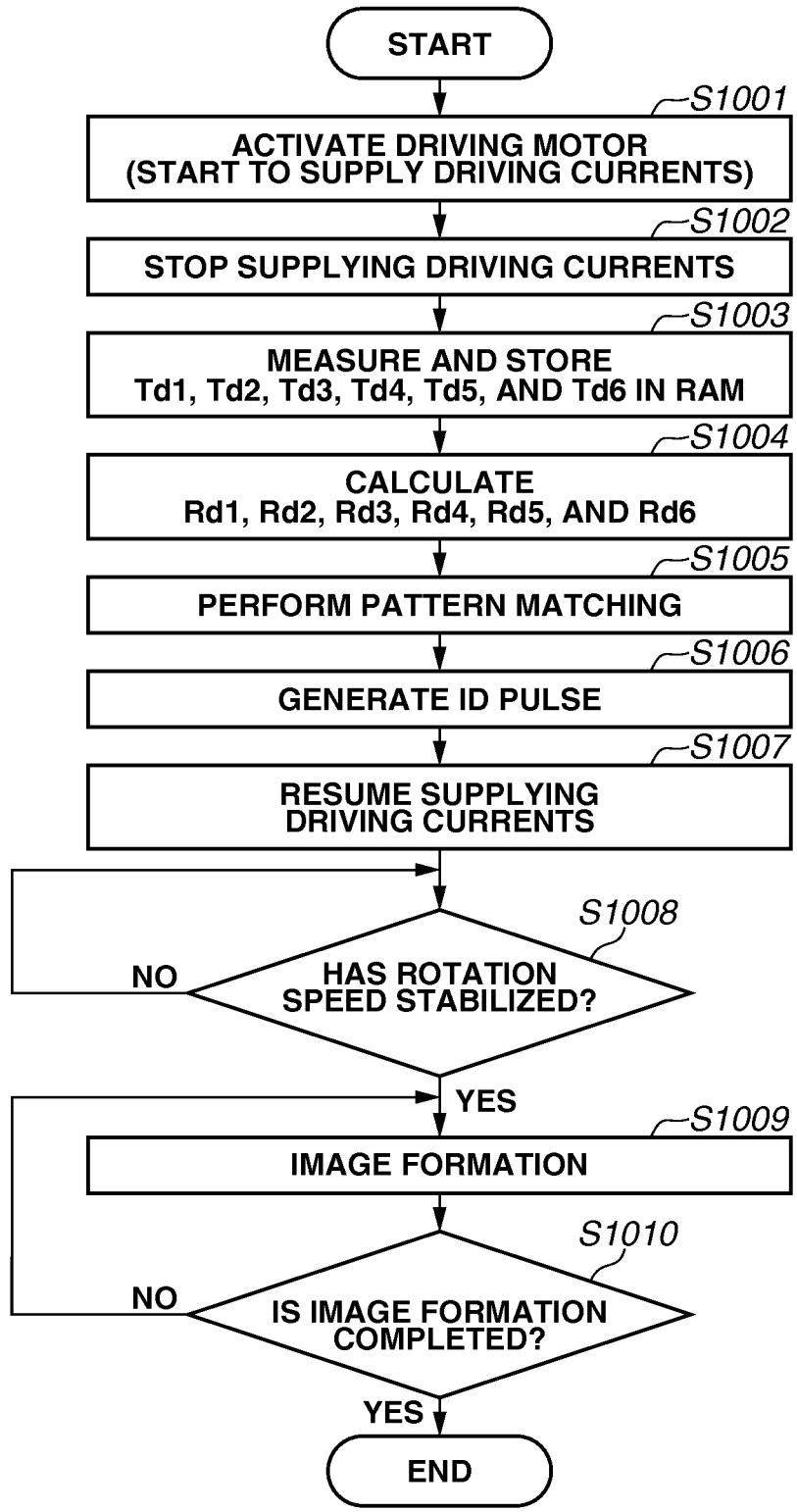

DRIVING DEVICE OF ROTATING POLYGONAL MIRROR AND IMAGE FORMING APPARATUS INCLUDING THE DRIVING DEVICE

BACKGROUND

Field of the Invention

The present disclosure relates to a driving device of a rotating polygonal mirror for driving a rotating polygonal mirror including a plurality of reflection surfaces, and an image forming apparatus including the driving device.

Description of the Related Art

An image forming apparatus has been known, which deflects a light beam emitted from a light source by using a rotating polygonal mirror (hereinafter, polygonal mirror) including a plurality of reflection surfaces so that the deflected light beam scans a photosensitive member to form an electrostatic latent image on the photosensitive member. Characteristics of the polygonal mirror such as reflectance of each reflection surface and an angle (plane tilt) thereof with respect to the rotation axis vary depending on cutting accuracy during manufacturing. Variations in the manufacturing accuracy therefore need to be corrected by identifying the reflection surface on which the light beam is incident and making corrections according to the identified reflection surface.

As a method for identifying the reflection surface on which the light beam is incident, Japanese Patent Application Laid-Open No. 2007-78723 discloses an image forming apparatus that identifies the reflection surface on which the light beam is incident by using a beam detecting (BD) signal and a frequency generator (FG) signal. The BD signal is generated by a BD (Beam Detector) that receives the light beam deflected by each of the plurality of reflection surfaces during one rotation. The FG signal is generated by detecting a magnetic pattern arranged on a driving motor that rotates the polygonal mirror.

Since the FG signal is generated by detecting the magnetic pattern, the FG signal (generally sinusoidal curves 1201 and 1203 in FIG. 12) includes noise 1203 generated due to the influence of a driving current supplied to a coil of the driving motor. This can make it difficult to accurately detect the period of the FG signal.

SUMMARY

According to an aspect disclosed herein, a driving device of a rotating polygonal mirror for rotating the rotating polygonal mirror includes a driving motor including a rotor to which the rotating polygonal mirror is fixed, a stator including a coil to which a driving current for driving the rotor is supplied, and a magnet that is attached to the rotor and in which a plurality of N poles and a plurality of S poles are alternately magnetized along a rotation direction of the rotor, a detection element configured to detect a magnetic pattern of the magnet, a driving unit configured to supply the driving current to the coil, and an acquisition unit configured to control the driving unit so that the driving unit stops supplying the driving current to the driving motor in a state where the driving current is supplied to rotate the rotating polygonal mirror, and acquire a period of a detected waveform output from the detection element in the state where supply of the driving current is stopped.

According to another aspect disclosed herein, a driving device of a rotating polygonal mirror for rotating the rotating polygonal mirror includes a motor including a rotor to which the rotating polygonal mirror is fixed, a stator including a coil to which a driving current for rotating the rotor is supplied, and a magnet that is attached to the rotor and in which a plurality of N poles and a plurality of S poles are alternately magnetized along a rotation direction of the rotor, a detection element configured to detect a magnetic pattern of the magnet, a driving unit configured to supply the driving current to the coil, and an acquisition unit configured to control the driving unit so that the driving unit reduces output of the driving current to the driving motor in a state where the driving current is supplied to rotate the rotating polygonal mirror, and acquire a period of a detected waveform output from the detection element in the state where the output of the driving current is reduced.

Further features of the present invention will become apparent from the following description of exemplary embodiments with reference to the attached drawings.

BRIEF DESCRIPTION OF THE DRAWINGS

FIG. 4 is a control block diagram.

FIGS. 5A and 5B is a timing chart of an FG signal.

FIG. 5C is a timing chart of the FG signal.

FIG. 7 illustrates a control flow to be executed when generating the reference period ratio data.

FIG. 8 is a timing chart of one scan period during image formation.

FIGS. 9A and 9B are diagrams illustrating changes of rotation speed of the driving motor and execution timing of controls from when the driving motor is activated to when image formation is started.

FIG. 10 illustrates a control flow of an image forming apparatus according to a first exemplary embodiment.

DESCRIPTION OF THE EMBODIMENTS

Various exemplary embodiments, features, and aspects of the invention will be described in detail below with reference to the drawings.

(Image Forming Apparatus)

Figure 1:
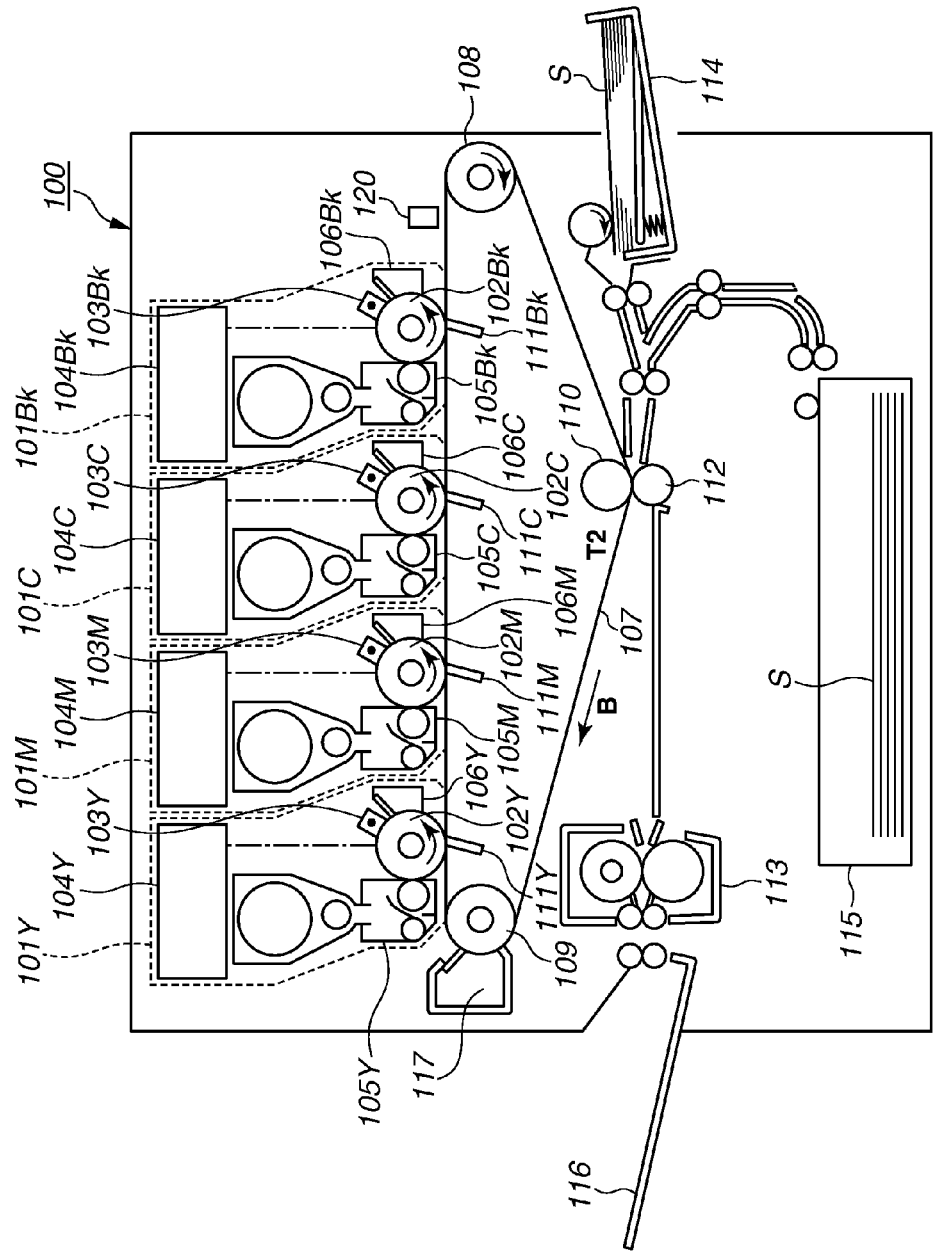
FIG. 1 is a schematic sectional view of an image forming apparatus.

A first exemplary embodiment will be described below. FIG. 1 is a schematic sectional view of a color image forming apparatus including a plurality of color toners. While the exemplary embodiment is described by using a color image forming apparatus as an example, the exemplary embodiment is not limited to a color image forming apparatus and may be an image forming apparatus that forms an image with monochromatic toner (for example, black).

In FIG. 1, the image forming apparatus 100 includes four image forming units 101Y, 101M, 101C, and 101Bk which form an image in respective colors. As employed herein, Y, M, C, and Bk represent yellow, magenta, cyan, and black, respectively. The image forming units 101Y, 101M, 101C, and 101Bk form an image by using yellow, magenta, cyan, and black toners, respectively.

The image forming units 101Y, 101M, 101C, and 101Bk include photosensitive drums 102Y, 102M, 102C, and 102Bk serving as photosensitive members. Charging devices 103Y, 103M, 103C, and 103Bk, optical scanning devices 104Y, 104M, 104C, and 104Bk, and developing devices 105Y, 105M, 105C, and 105Bk are arranged around the photosensitive drums 102Y, 102M, 102C, and 102Bk. Drum cleaning devices 106Y, 106M, 106C, and 106Bk are also arranged around the photosensitive drums 102Y, 102M, 102C, and 102Bk.

An endless belt-shaped intermediate transfer belt 107 is arranged below the photosensitive drums 102Y, 102M, 102C, and 102Bk. The intermediate transfer belt 107 is stretched across a driving roller 108 and driven rollers 109 and 110. The intermediate transfer belt 107 rotates in the direction of the arrow B in the diagram during image formation. Primary transfer devices 111Y, 111M, 111C, and 111Bk are positioned opposed to the photosensitive drums 102Y, 102M, 102C, and 102Bk with the intermediate transfer belt 107 therebetween.

The image forming apparatus 100 according to the present exemplary embodiment further includes a secondary transfer device 112 and a fixing device 113. The secondary transfer device 112 is intended to transfer a toner image on the intermediate transfer belt 107 to a recording medium S. The fixing device 113 is intended to fix the toner image on the recording medium S.

A series of image formation steps by which an image is formed on a recording medium S will be described below. In a charging step, the charging device 103Y initially charges the surface of the photosensitive drum 102Y to a predetermined uniform potential. In the next exposure step, the surface of the photosensitive drum 102Y is exposed to laser light (light beam) emitted from the optical scanning device 104Y. In the next developing step, the developing device 105Y develops an electrostatic latent image to form a yellow toner image. Magenta, cyan, and black toner images are formed through steps similar to the foregoing.

The color toner images formed on the respective photosensitive drums 102Y, 102M, 102C, and 102Bk are transferred to the intermediate transfer belt 107 by biases applied by the primary transfer devices 111Y, 111M, 111C, and 111Bk. In other words, the color toner images are transferred from the respective photosensitive drum 102Y, 102M, 102C, and 102Bk to the intermediate transfer belt 107, whereby the color toner images are superposed on each other.

The superposed toner images on the intermediate transfer belt 107 are transferred to a recording medium S by a bias applied by the secondary transfer device 112. The recording medium S has been conveyed from a manual feed cassette 114 or a sheet feeding cassette 115 to a secondary transfer part T2. An intermediate belt cleaner 117 is arranged downstream of the secondary transfer unit T2 to be opposed to the intermediate transfer belt 107. Toner left on the intermediate transfer belt 107 without being transferred to the recording medium S is collected by the intermediate belt cleaner 117.

The secondary transfer device 112 can apply a bias of opposite polarity to that of a secondary transfer bias that is intended to transfer the toner on the surface of the intermediate transfer belt 107 to the recording medium S. In such a manner, toner adhering to the secondary transfer device 112 can be moved to the surface of the intermediate transfer belt 107 and collected by the intermediate transfer belt cleaner 117.

The toner images transferred to the recording medium S are heated and fixed by the fixing device 113 before discharged to a sheet discharge unit 116. By such steps, a full color image is formed on the recording medium S.

Residual toner remaining on the surfaces of the respective photosensitive drums 102Y, 102M, 102C, and 102Bk after the primary transfer is finished, is removed by the drum cleaning devices 106Y, 106M, 106C, and 106Bk.

(Optical Scanning Device)

Figure 2:
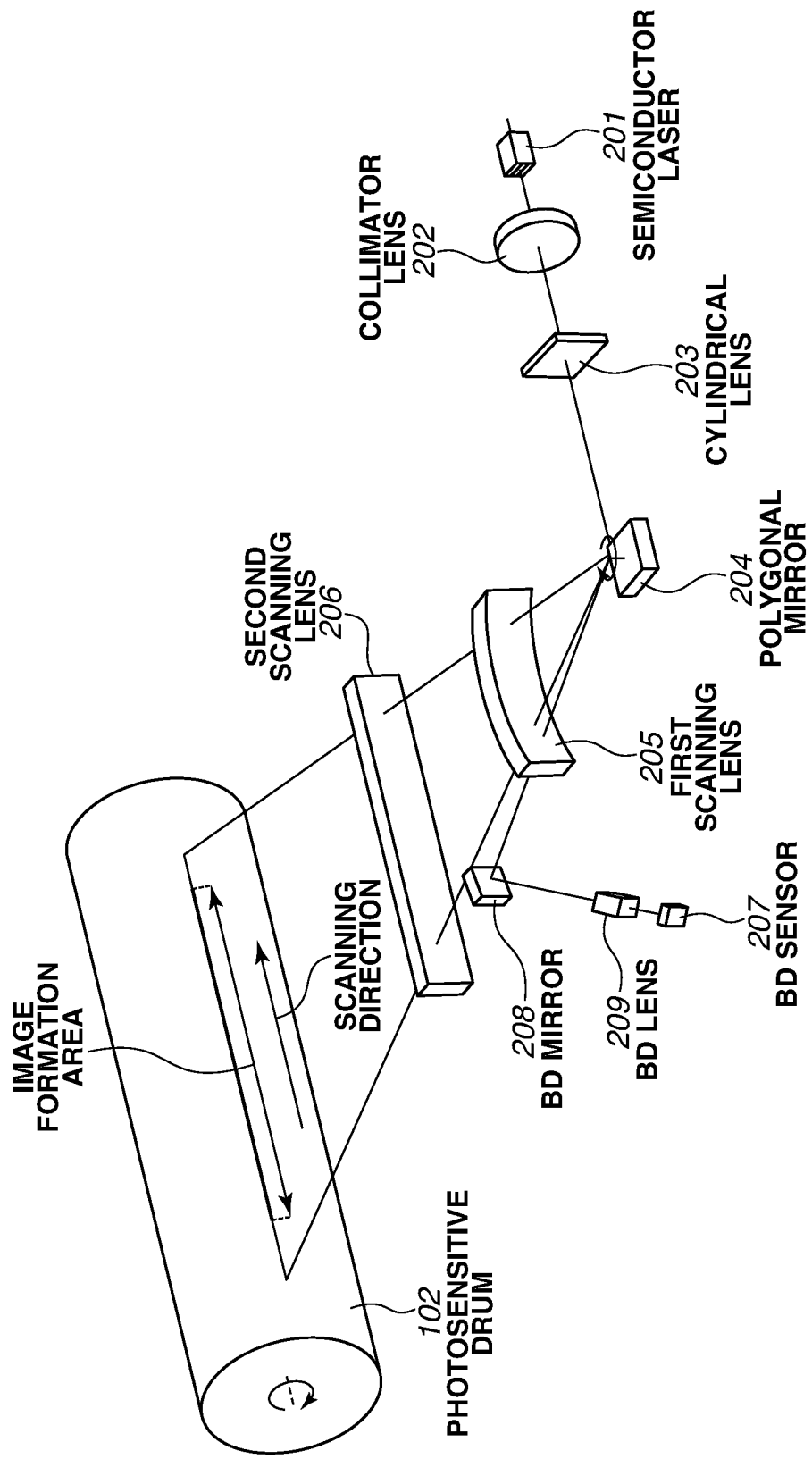
FIG. 2 is a schematic configuration diagram illustrating an optical scanning device.

FIG. 2 is a diagram illustrating a detailed configuration of the optical scanning devices 104Y, 104M, 104C, and 104Bk which are light beam emission devices included in the image forming apparatus 100 illustrated in FIG. 1. In the following description, the - suffixes Y, M, C, and Bk representing the color will be omitted because the optical scanning devices have the same configuration.

The optical scanning device 104 includes a semiconductor laser 201, a collimator lens 202, a cylindrical lens 203, and a polygonal mirror (rotating polygonal mirror) 204. The semiconductor laser 201 emits laser light as a light beam. The collimator lens 202 shapes the laser light emitted from the semiconductor laser 201 into parallel light. The cylindrical lens 203 condenses the laser light passed through the collimator lens 202 in a sub scanning direction (direction corresponding to the rotation direction of the photosensitive drum 102).

The optical scanning device 104 further includes a first scanning lens 205 and a second scanning lens 206. The laser light (scanning light) deflected by the polygonal mirror 204 is incident on the first scanning lens 205.

The polygonal mirror 204 includes a plurality of reflection surfaces. In the present exemplary embodiment, the polygonal mirror 204 includes four reflection surfaces, however, a polygonal mirror including a different number of reflection surfaces may be employed. In an image forming operation, the polygonal mirror 204 is driven to rotate by a driving motor described below, whereby the laser light emitted from the semiconductor laser 201 is deflected by the reflection surfaces of the rotating polygonal mirror 204.

The laser light deflected by the polygonal mirror 204 passes through the first scanning lens 205 and the second second lens 206 to scan the photosensitive drum 102 in a main scanning direction (the direction of the rotation axis of the photosensitive drum 102). The scanning by the laser light forms an electrostatic latent image on the photosensitive drum 102.

A BD mirror 208 is arranged at an end of the scanning range of the laser light (outside an image formation area on the photosensitive drum 102). The BD mirror 208 reflects the laser light. The laser light reflected by the BD mirror 208 is incident on a BD 207 via a BD lens 209.

The BD 207 generates a synchronization signal by receiving the laser light emitted from the semiconductor laser 201. The image forming apparatus 100 emits the laser light based on the image data or the semiconductor laser 201 according to the synchronization signal, whereby the formation start positions of the electrostatic latent image (image) in the main scanning direction at respective scanning periods are aligned.

(Driving Motor)

Figure 3A:
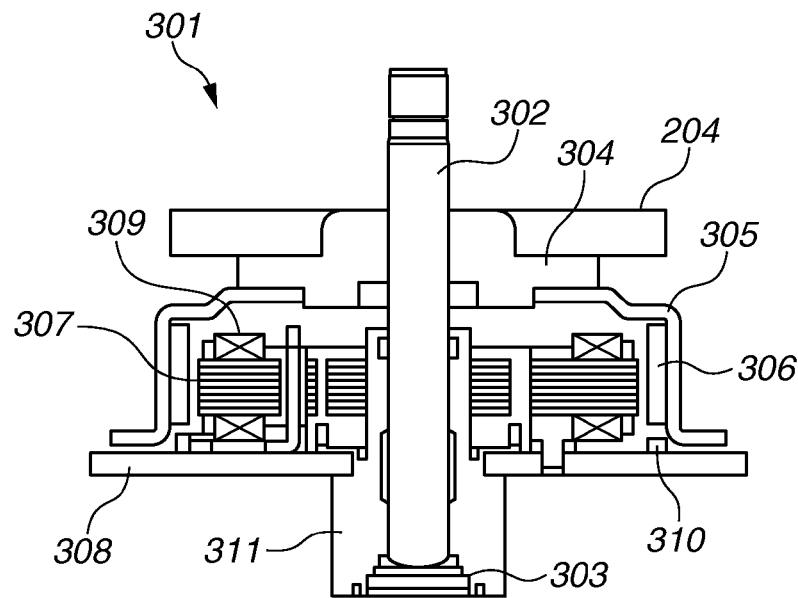
FIGS. 3A and 3B are schematic configuration diagrams illustrating a driving motor.
Figure 3B:
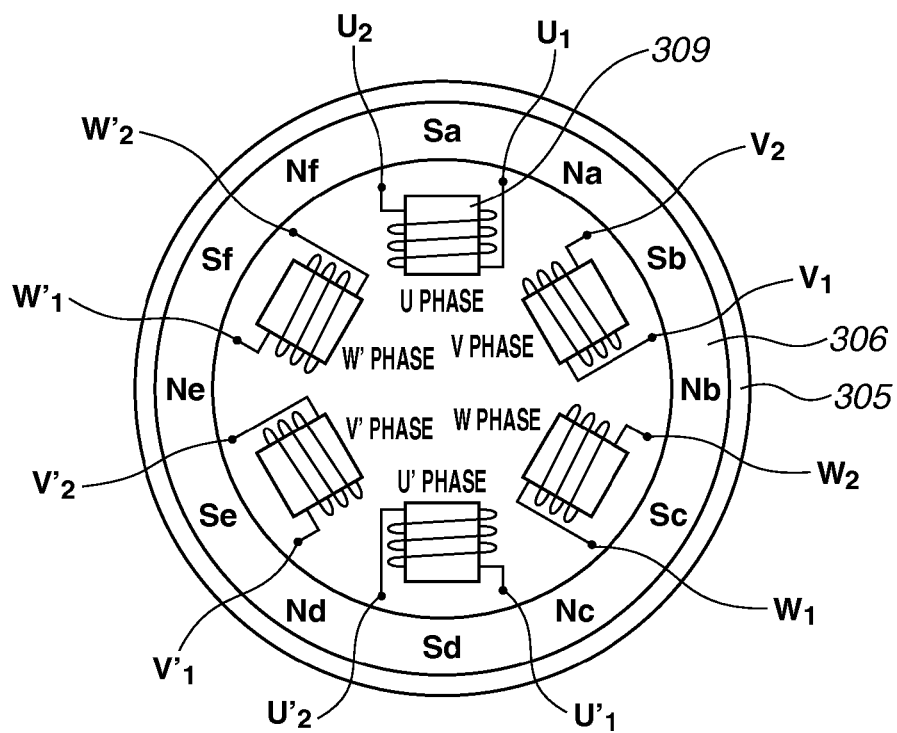

Next, a driving motor 301 for rotating the polygonal mirror 204 will be described. FIG. 3A illustrates a sectional view of the driving motor 301. FIG. 3B is a top view of FIG. 3A, obtained by extracting only necessary parts.

A rotation shaft 302, a permanent magnet 306, a yoke 305, and a supporting unit 304 constitute a rotor. The permanent magnet 306 and the supporting unit 304 are attached to the yoke 305. The polygonal mirror 204 and the rotation shaft 302 are fixed to the supporting unit 304.

A bearing unit 301 and a stator core 307 constitute a stator. The bearing unit 301 is made of metal material such as brass. The stator core 307 is fixed to a circuit board 308. The bearing unit 311 is a member that supports the rotation shaft 302 which is made of metal material such as stainless steel. The stator core 307 includes a plurality of driving coils 309 to which driving currents for rotating the rotor are supplied.

As illustrated in FIG. 3B, the permanent magnet 306 has a magnetic pattern in which south (S) poles (Sa pole, Sb pole, Sc pole, Sd pole, Se pole, and Sf pole) and north (N) poles (Na pole, Nb pole, Nc pole, Nd pole, Ne pole, and Nf pole) are alternately arranged along the rotation direction of the rotor (yoke 305). In the present exemplary embodiment, the permanent magnet 306 of the driving motor 301 is magnetized to have six S poles and six N poles alternately arranged in the direction corresponding to the rotation direction of the rotor so that an FG signal of six FG pulses is generated during one rotation of the rotor. The polygonal mirror 204 and the permanent magnet 306 are both fixed to the yoke 305. The relative positional relationship of the reflection surfaces of the polygonal mirror 204 to the S poles (Sa pole, Sb pole, Sc pole, Sd pole, Se pole, and Sf pole) and the N poles (Na pole, Nb pole, Nc pole, Nd pole, Ne pole, and Nf pole) therefore remains unchanged.

As illustrated in FIG. 3B, the driving motor 301 according to the present exemplary embodiment includes a U phase coil, a U' phase coil, a V phase coil, a V' phase coil, a W phase coil, and a W' phase coil as the plurality of driving coils 309. A terminal U1, a terminal U'2, a terminal V1, a terminal V'2, a terminal W1, and a terminal W'2 are each connected to a motor driver to be described below via the circuit board 308. The terminals U2 and U'1, the terminals V2 and V'1, and the terminals W2 and W'1 are connected to each other. Energization of the U and U' phase coils, the V and V' phase coils, and the W and W' phase coils with the driving currents is switched depending on the rotation position of the permanent magnet 306. Energizing the driving coils 309 with the driving currents generates a magnetic force between the driving coils 309 and the permanent magnet 306, whereby the rotor is rotated.

A detection element 310 for detecting the magnetic pattern of the permanent magnet 306 is arranged on the circuit board 308. A Hall device or a magnetic sensor is used as the detection element 310. The detection element 310 may be arranged in any position as long as fixed to the stator.

(Driving Motor and Control Block Diagram)

FIG. 4 is a control block diagram of the image forming apparatus 100 according to the present exemplary embodiment. The control block diagram illustrated in FIG. 4 corresponds to each of the Y, M, C, and Bk colors. The image forming apparatus 100 has the same configuration for each color.

The image forming apparatus 100 according to the present exemplary embodiment includes a driving device for driving and rotating the polygonal mirror 204. The image forming apparatus 100 includes a central processing unit (CPU) 401 (acquisition unit, control unit), a read-only memory (ROM) 402, and a random access memory (RAM) 403. The ROM 402 stores a control program for the CPU 401 to execute. The RAM 403 provides a work area for the CPU 401. Further, the image forming apparatus 100 according to the present exemplary embodiment includes a BD detection unit 404, a laser driver 405 (laser driving unit), a motor driver 406 (motor driving unit), and an electrically erasable programmable read-only memory (EEPROM) 407. The BD detection unit 404 converts an analog signal from the BD 207 into a digital BD signal. The laser driver 405 drives the semiconductor laser 201 according to a video signal which is generated based on image data input from a reading device or an external information apparatus. The motor driver 406 drives the driving motor 301. The EEPROM 407 is a nonvolatile memory.

The detection element 310 illustrated in FIG. 3 is connected to the motor driver 406. The detection element 310 outputs a period detection signal (FG analog signal) according to the rotation speed of the permanent magnet 306 rotating along with the rotation of the rotor. For example, the detection element 310 according to the present exemplary embodiment detects the magnetic pattern while the rotor is rotating, and outputs detection signals having an approximately sinusoidal waveform (detected waveform) illustrated in solid lines in FIG. 5A.

The detection element 310 according to the present exemplary embodiment outputs a detection signal 501 (first waveform signal) and a detection signal 502 (second waveform signal) showing a 180° phase shift from that of the detection signal 501. The detection signals 501 and 502 are differential signals. In the present exemplary embodiment, as illustrated in FIG. 5A, the detection signal 501 reaches a maximum value (the detection signal 502 shows a minimum value) when the center of any one of the plurality of S poles lies in a position opposed to the detection element 310. In the present exemplary embodiment, as illustrated in FIG. 5A, the detection signal 501 shows a minimum value (the detection value 502 reaches a maximum value) when the center of any one of the plurality of N poles lies in the position opposed to the detection element 310.

The motor driver 406 includes a pulse signal generator which generates FG pulses based on the detection signals 501 and 502, which are the FG analog signals. As illustrated in FIGS. 5A and 5B, the pulse signal generator generates FG pulses that rise and fall at the intersections of the detection signals 501 and 502. The pulse signal generator makes the FG signal rise if the detection signal 501 is increasing monotonically and the detection signal 502 is decreasing monotonically when the two detection signals 501 and 502 intersect each other. The pulse signal generator makes the FG signal fall if the detection signal 501 is decreasing monotonically and the detection signal 502 is increasing monotonically when the two detection signals 501 and 502 intersect each other. As a result, FG pulses 503, 504, 505, 506, 507, and 508 illustrated in FIG. 5B are generated during one rotation of the polygonal mirror 204.

In such a manner, the FG signal is generated by using the detection signals 501 and 502, which are the differential signals. Consequently, even if the output characteristic of the detection element 310 varies due to heat generation of the driving motor 301, a significant change in the detection accuracy of the magnetic pattern 306 can be suppressed before and after the output characteristic varies.

The motor driver 406 outputs the FG signal to the CPU 401. The CPU 401 outputs an acceleration signal (ACC signal) or a deceleration signal (DEC signal) to the motor driver 406 based on the FG signal until the rotor (polygonal mirror 204) reaches a predetermined rotation speed from a rotation-stopped state. The motor driver 406 controls the values of the driving currents supplied to the terminals U1, V1, and W1 based on the ACC signal or DEC signal from the CPU 401.

The CPU 401 determines whether the rotation speed of the rotor has come close to a target speed, based on a detected period of the FG signal. If the rotation speed of the rotor is determined to have come close to the target speed, the CPU 401 switches from the output control of the ACC signal or DEC signal based on the detected period of the FG signal to the output control of the ACC signal or DEC signal based on a detected period of the BD signal. This is because the generation period of the FG signal depends on the magnetization accuracy of the magnetic pattern and the BD 207 has a positional accuracy higher than the magnetization accuracy of the magnetic pattern. On the other hand, if the rotation speed of the rotor significantly differs from the target speed, the CPU 401 cannot determine in what timing the semiconductor laser 201 should emit the laser light to successfully make the laser light enter the BD 207. It is possible to make the laser light enter the BD 207 by accelerating or decelerating the rotor with the laser light on. However, such an operation has problems in that life of the semiconductor laser 201 is shortened or a ghost image occurs due to the exposure of the photosensitive drum 102 to the laser light. Therefore, it is desirable that after the rotation speed of the rotor is increased to a certain target value by using the FG signal, the rotation speed of the polygonal mirror 204 is adjusted (the values of the driving currents supplied to the terminals U1, V1, and W1 are controlled) by controlling the rotation speed of the rotor by using the BD signal. If the accuracy of the detected period of the FG signal can be ensured like the detected period of the BD signal, the FG signal may be used to control the rotation speed of the polygonal mirror 204.

The CPU 401 includes an oscillator (not illustrated) that generates a clock signal of 100 MHz, a counter (first counter) that counts the clock signal, and a counter (second counter) that counts FG pulses. The first counter counts the clock signal from the rise of an FG pulse to the rise of the next FG pulse, and the CPU 401 stores the count value in the RAM 403. The CPU 401 performs such an operation in each period of the FG signal. The second counter increments a count value by one each time an FG pulse rises. The second counter resets the count value to "0" when an FG pulse rises after the count value has reached "5."

The RAM 403 has a plurality of addresses assigned to the respective count values "0" to "5" of the second counter. The CPU 401 stores the count value of the first counter into one of the plurality of addresses, according to the count value of the second counter.

Since polishing accuracy in manufacturing the polygonal mirror 204 is limited, the plurality of reflection surfaces of the polygonal mirror 204 may have slightly different reflectances from each other. Due to the limit of cutting accuracy and polishing accuracy in manufacturing the polygonal mirror 204, the plurality of reflection surfaces of the polygonal mirror 204 may fail to form a no-error regular polygon. To output a high quality image, the image processing apparatus 100 needs to correct such errors during image formation.

The image processing apparatus 100 according to the present exemplary embodiment then includes the EEPROM 407 (storage unit, memory unit) in which correction data for correcting the errors is stored. Specifically, the EEPROM 407 stores adjustment values inherent to the optical scanning device 104. For example, light amount correction data, write position correction data, and magnification correction data in the main scanning direction, are stored which correspond to the respective reflection surfaces. The CPU 401 identifies a reflection surface to be described below, on which the laser light is incident, reads correction data corresponding to the identified result from the EEPROM 407, and controls the laser driver 405 based on the read correction data. Such correction data is generated for each optical scanning device 104 based on the characteristics of the polygonal mirror 204 attached to the optical scanning device 104, which are measured in an assembly step in the factory.

(Method for Identifying Reflection Surfaces by Using FG Signal)

As illustrated in FIG. 5A, the analog detection signals (501 and 502) output from the detection element 310 usually do not have a constant amplitude or a constant period. This is because the permanent magnet 206 is generated with variations in the magnetization intensity and/or magnetization position in the rotation direction of the rotor, or the distance between the permanent magnet 206 of the rotor and the detection element 310 is not constant due to design accuracy. As a result, the FG signal which is generated a plurality of times during one rotation of the rotor has irregular periods.

Therefore, variations of the period of the FG signal while the image forming apparatus 100 is in operation is utilized to identify the reflection surface on which the laser light emitted from the semiconductor laser 201 is incident among the plurality of reflection surfaces of the polygonal mirror 204. Specifically, the reflection surface on which the laser light is incident is identified based on the relative positional relationship between the poles (S poles and N poles) of the permanent magnet 306 and the reflection surfaces of the polygonal mirror 204.

Figure 6A:
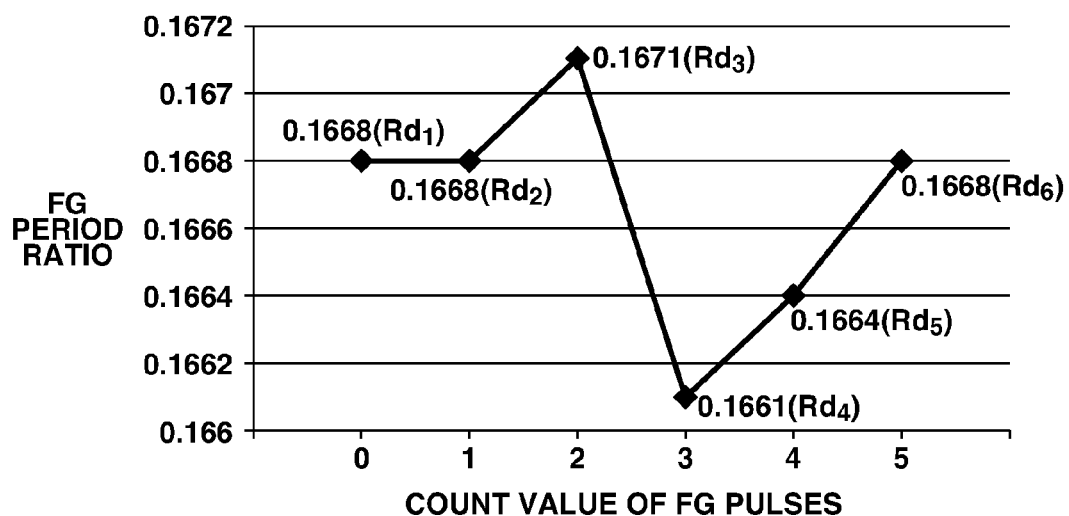
FIGS. 6A and 6B are charts illustrating detection period ratio data and reference period ratio data.

FIG. 6A is a chart illustrating the period ratios of periods Td1, Td2, Td3, Td4, Td5, and Td6 of the FG signal with respect to a one-rotation period Td0 of the rotor. The periods Td0 to Td6 are count values of the first counter. The ratios (period ratios, detection period ratio data) of the periods Td1, Td2, . . . , Td6 to the period Td0 will be denoted by Rd1, Rd2, . . . , Rd6, respectively. The horizontal axis of FIG. 6A indicates the count values of the second counter, "0" to "5." The CPU 401 detects the one-rotation period Td0 of the rotor and the periods Td1, Td2, Td3, Td4, Td5, and Td6 of the FG signal in the one-rotation period Td0 of the rotor based on the FG signal from the motor driver 406. The CPU 401 then calculates the detection period ratio data Rd1 to Rd6 based on the detected periods Td0, Td1, Td2, Td3, Td4, Td5, and Td6. The CPU 401 stores the detection period ratio data Rd1 to Rd6 at the plurality of addresses of the RAM 403 in association with the count values of the second counter so that the order in which the periods Td1, Td2, Td3, Td4, Td5, and Td6 are detected can be identified.

If the detection element 310 outputs ideal sinusoidal waveforms, all the period ratios Rd1 to Rd6 are 1.667 (=⅙). Since the period of the FG signal varies due to the foregoing reasons, the period ratios Rd1 to Rd6 vary as illustrated in FIG. 6A.

Figure 6B:
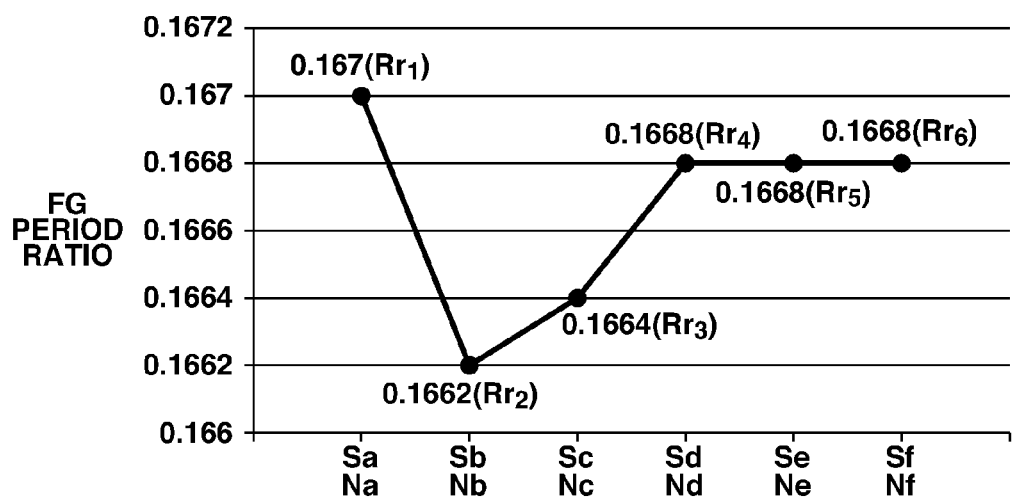

The EEPROM 407 contains reference period ratio data (period data) for performing pattern matching with the sequence of the detection period ratio data Rd1 to Rd6. The reference period ratio data is associated with the plurality of S poles and the plurality of N poles included in the magnetic pattern. For example, as illustrated in FIG. 6B, reference period ratio data Rr1 corresponds to the Sa pole and the Na pole. Reference period ratio data Rr2 corresponds to the Sb pole and the Nb pole. Reference period ratio data Rr3 corresponds to the Sc pole and the Nc pole. Reference period ratio data Rr4 corresponds to the Sd pole and the Nd pole. Reference period ratio data Rr5 corresponds to the Se pole and the Ne pole. Reference period ratio data Rr6 corresponds to the Sf pole and the Nf pole.

(Storing of Surface-Specific Correction Data at Factory)

Now, a method for generating the reference period ratio data Rr1 to Rr6 will be described. The reference period ratio data Rr1 to Rr6 is generated at the time of assembly of the optical scanning device 104 in the factory, and stored in the EEPROM 407. FIG. 7 illustrates a control flow that the CPU 401 executes when generating the reference period ratio data Rr1 to Rr6.

In step S701, the CPU 401 initially outputs the ACC signal to the motor driver 406 to activate the driving motor 301. In step S702, the CPU 401 determines whether the rotation speed of the rotor has stabilized at a target speed. The target speed of step S702 may be any rotation speed. In the present exemplary embodiment, the target speed is the rotation speed of the rotor during image formation.

In step S702, if it is determined that the rotation speed of the rotor has not stabilized (NO in step S702), the CPU 401 returns the control to step S702. In step S702, if it is determined that the rotation speed of the rotor has stabilized (YES in step S702), then in step S703, the CPU 401 measures a one-rotation period Tr0 of the rotor and the periods Tr1, Tr2, Tr3, Tr4, Tr5, and Tr6 of the FG signal in the one-rotation period Tr0. The CPU 401 then calculates the ratios of the periods Tr1, Tr2, Tr3, Tr4, Tr5, and Tr6 to the one-rotation period Tr0, and stores the calculation results in the EEPROM 407 as the reference period ratio data Rr1, Rr2, Rr3, Rr4, Rr5, and Rr6. In step S703, the CPU 401 performs the measurement n times.

In step S704, the CPU 401 calculates the ratios of the periods Tr1, Tr2, Tr3, Tr4, Tr5, and Tr6 to the one-rotation period Tr0 to determine the reference period ratio data Rr1, Rr2, Rr3, Rr4, Rr5, and Rr6. In step S705, the CPU 401 stores the reference period ratio data Rr1, Rr2, Rr3, Rr4, Rr5, and Rr6 in the EEPROM 407.

After step S705, in step S706, the CPU 401 sets identification (ID) pulse rise timing. For example, the CPU 401 sets generation timing of an ID pulse so that the ID pulse rises in synchronization with the rise of an FG pulse which shows the largest reference period ratio data (see the ID signal of FIG. 8). In step S707, the CPU 401 sets the second counter so that the count value of the second counter is reset to "0" in synchronization with the rise of the ID pulse. The CPU 401 thereby assigns the count values of the second counter to the respective FG pulses as illustrated in FIG. 8.

In step S708, the CPU 401 sets timing to read correction data from the EEPROM 407 with respect to the count values assigned in step S707. For example, the CPU 401 sets the timing to read the correction data from the EEPROM 407 so that the following correction operations are performed during image formation. The CPU 401 reads correction data B corresponding to a reflection surface B of the polygonal mirror 204 in response to rise of the FG pulse 503 which makes the count value "0" illustrated in FIG. 8. The CPU 401 then corrects the input image data to emit the light beam to be incident on the reflection surface B, by using the correction data B.

The CPU 401 reads correction data C corresponding to a reflection surface C of the polygonal mirror 204 in response to the rise of the FG pulse 504 which makes the count value "1." The CPU 401 then corrects the input image data to emit the light beam to be incident on the reflection surface C, by using the correction data C.

In addition, the CPU 401 reads correction data D corresponding to a reflection surface D of the polygonal mirror 204 in response to the rise of the FG pulse 506 which makes the count value "3." The CPU 401 then corrects the input image data to emit the light beam to be incident on the reflection surface D, by using the correction data D.

Further, the CPU 401 reads correction data A corresponding to a reflection surface A of the polygonal mirror 204 in response to the rise of the FG pulse 507 which makes the count value "4." The CPU 401 then corrects the input image data to emit the light beam to be incident on the reflection surface A, by using the correction data A.

After the end of the foregoing steps S701 to S708, the CPU 401 ends the control flow illustrated in FIG. 7.

(Method for Identifying Periods of FG Signal)

Figure 12:
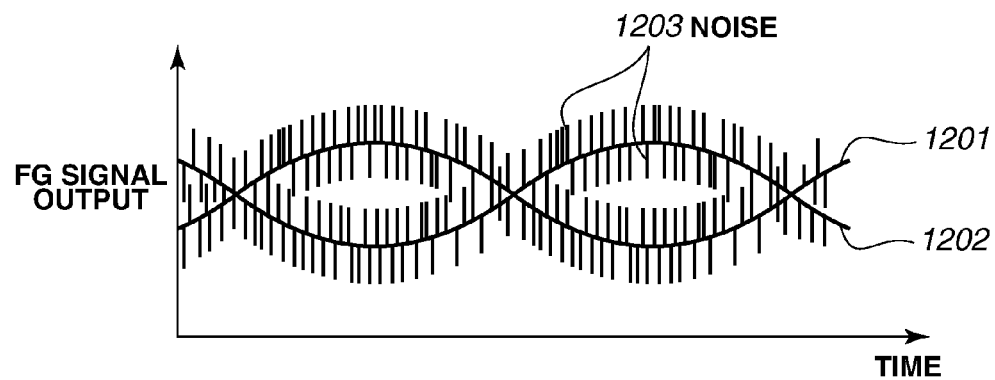
FIG. 12 is a diagram illustrating an FG signal according to a conventional technique.

A method by which the CPU 401 identifies the periods of the FG signal will be described. As illustrated in FIG. 12, the output of the detection element 310 includes noise in a state where the driving currents are supplied to the driving motor 301.

To measure the periods of the FG signal, the CPU 401 according to the present exemplary embodiment stops supplying the driving currents from the motor driver 406 to the driving motor 301. The CPU 401 then measures the periods Td0, Td1, Td2, Td3, Td4, Td5, and Td6 of the FG signal based on the output of the detection element 310 in a state where the supply of the driving currents is stopped.

FIGS. 9A and 9B are diagrams each illustrating a transition of the rotation speed of the driving motor 301, and execution timing of controls from when the supply of the driving currents to the driving motor 301 is started to when image formation is started.

For example, to measure the periods of the FG signal, the CPU 401 makes the motor driver 406 stop supplying the driving currents to the driving motor 301 at "measurement timing" in a period where the rotation speed of the polygonal mirror 204 is accelerating, illustrated in FIG. 9A. The "measurement timing" illustrated in FIG. 9A lies in a period where the motor driver 406 is supplying the driving currents to the driving motor 301 to accelerate the rotation speed of the polygonal mirror 204 to the target rotation speed (a state where the driving currents supply is stopped). The CPU 401 stores into the RAM 403 the periods Td0, Td1, Td2, Td3, Td4, Td5, and Td6 of the FG signal that is output at the above timing from the detection element 310 to the motor driver 406 and converted into the pulse signal.

To measure the periods of the FG signal, the CPU 401 may also make the motor driver 406 stop supplying the driving currents to the driving motor 301 at the "measurement timing" illustrated in FIG. 9B. The "measurement timing" illustrated in FIG. 9B lies in a period where the motor driver 406 is supplying the driving currents to the driving motor 301 to maintain the rotation speed of the polygonal mirror 204 to the target rotation speed. The CPU 401 stores into the RAM 403 the periods Td0, Td1, Td2, Td3, Td4, Td5, and Td6 of the FG signal that is output at such timing from the detection element 310 to the motor driver 406 and converted into the pulse signal.

The stop period of the driving currents can be a period in which the rotor makes at least 50 revolutions so that a plurality of period groups of the FG signal is measured.

Aside from the exemplary embodiment of making the motor driver 406 stop supplying the driving currents to the driving motor 301, the CPU 401 may measure the periods of the FG signal by reducing the output of the driving currents from the motor driver 406 to the driving motor 301.

More specifically, suppose that in FIG. 9A, driving currents of X mA are supplied to accelerate the rotation speed of the polygonal mirror 204 to the target rotation speed. In such a case, the CPU 401 reduces the value of the driving currents to Z mA (Z<X) at the "measurement timing." In the state where the driving currents for accelerating the polygonal mirror 204 are being supplied, the CPU 401 relatively reduces the output of the driving currents and measures the periods Td0, Td1, Td2, Td3, Td4, Td5, and Td6 of the FG signal with the output of the driving currents reduced. If, in FIG. 9B, driving currents of Y mA are supplied to maintain the rotation speed of the polygonal mirror 204 to the target rotation speed, the CPU 401 decreases the value of the driving currents to Z mA (Z<Y) at the "measurement timing." In the state where the driving currents for maintaining the polygonal mirror 204 at the target rotation speed are being supplied, the CPU 401 relatively reduces the output of the driving currents and measures the periods Td0, Td1, Td2, Td3, Td4, Td5, and Td6 of the FG signal with the output of the driving currents reduced. In such a manner, the output of the driving currents to the driving motor 301 can be temporarily reduced to suppress the magnitude of the noise occurring in the FG signal.

(Method for Reading Correction Data After Start of Image Forming Operation)

Next, a method by which the CPU 401 identifies a reflection surface on which the light beam is incident and a method by which the CPU 401 reads the correction data after a start of an image forming operation will be described by using the flowcharts of FIGS. 10 and 11. The CPU 401 activates the driving motor 301 (starts to supply the driving currents) and then measures the period ratios of the FG signal to identify the poles magnetized in the permanent magnet 306 and generate the ID pulse. The CPU 401 then determines whether the periods of the FG signal have reached their target values. If the periods of the FG signal have stabilized, the CPU 401 emits the light beam to generate the BD signal and then starts image formation. Since the generation of the ID pulse is completed before the generation of the BD signal, the CPU 401 can identify the reflection surfaces if the BD signal for one rotation of the polygonal mirror 204 is obtained.

FIG. 10 illustrates a control flow related to a control in which the CPU 401 makes the motor driver 406 stop supplying the driving currents to the driving motor 301 to measure the periods of the FG signal.

In step S1001, the CPU 401 initially activates the driving motor 301 in response to input of image data from a not-illustrated reading device of the image forming apparatus 100 or an external information apparatus such as a personal computer (PC). In other words, the CPU 401 makes the motor driver 406 start to supply the driving currents to the driving motor 301. Here, the CPU 401 makes the second counter start to count FG pulses. In step S1002, in a state where the polygonal mirror 204 is rotating and the driving currents are supplied to the driving motor 301, the CPU 401 makes the motor driver 406 stop supplying the driving currents to the driving motor 301.

In step S1003, the CPU 401 measures the periods Td1, Td2, Td3, Td4, Td5, and Td6 of the FG signal and stores the measured values in the RAM 403 in association with the count values of the FG pulses. In step S1003, the CPU 401 performs the measurement of the periods n times. In step S1004, the CPU 401 calculates the detection period ratio data Rd1, Rd2, Rd3, Rd4, Rd5, and Rd6 associated with the count values of the FG pulses.

In step S1005, the CPU 401 performs pattern matching between the detection period ratio data calculated in step S1004 and the reference period ratio data stored in the EEPROM 407. In step S1005, the CPU 401 identifies the correspondence between the count values of the FG pulses obtained by the second counter and the FG pulses corresponding to the respective poles of the permanent magnet 306 based on the result of the pattern matching. The correspondence between the count values of the FG pulses and the FG pulses corresponding to the respective poles of the permanent magnets 306 in the example illustrated in FIGS. 6A and 6B is as follows:

TABLE 1

| Count Value of FG Pulse | FG Pulse Corresponding to Poles |
|---|---|
| 0 | FG pulse corresponding to Se/Ne poles |
| 1 | FG pulse corresponding to Sf/Nf poles |
| 2 | FG pulse corresponding to Sa/Na poles |
| 3 | FG pulse corresponding to Sb/Nb poles |
| 4 | FG pulse corresponding to Sc/Nc poles |
| 5 | FG pulse corresponding to Sd/Nd poles |

In step S1006, the CPU 401 generates the ID pulse when the count value of the FG pulse of the largest detection period ratio data has become 2, based on the correspondence shown in Table 1. The CPU 401 further sets the count value of the second counter again so that the count value of the second counter is reset to "0" in response to the generation of the ID pulse during image formation.

In step S1007, the CPU 401 makes the motor driver 406 resume supplying the driving currents to the driving motor 301 so that the rotation speed of the rotor reaches the target rotation speed.

After step S1007, in step S1008, the CPU 401 determines whether the rotation speed of the rotor has stabilized at the target rotation speed. The target rotation speed in step S1008 is the rotation speed corresponding to the speed of image formation (in the present exemplary embodiment, 40000 rpm).

In step S1008, if it is determined that the rotation speed of the rotor has not stabilized at 40000 rpm (NO in step S1008), the CPU 401 returns the control to step S1008. In step S1008, if it is determined that the rotation speed of the rotor has stabilized at 40000 rpm (YES in step S1008), then in step S1009, the CPU 401 performs image formation. In step S1010, the CPU 401 determines whether the image formation is completed. In step S1010, if it is determined that the image formation has not been completed (NO in step S1010), the CPU 401 returns the control to step S1009. If it is determined that the image formation has been completed (YES in step S1010), the CPU 401 ends the image formation. Since the timing to read the correction data during image formation has been described above, a description thereof is omitted.

Figure 11:
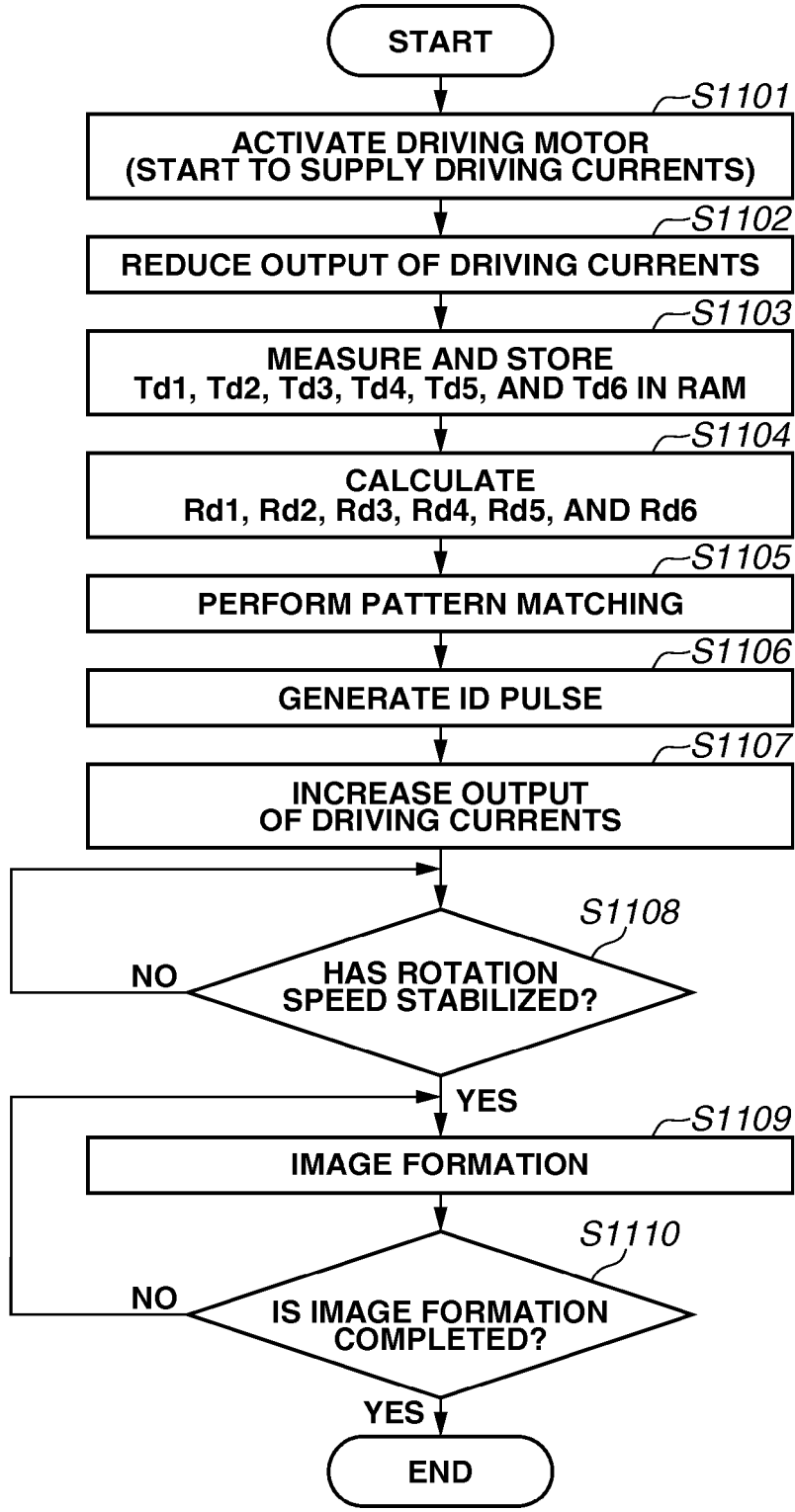
FIG. 11 illustrates a control flow (example modification) of the image forming apparatus according to the first exemplary embodiment.

FIG. 11 illustrates a control flow in which the CPU 401 temporarily reduces the output of the driving currents from the motor driver 406 to the driving motor 301 to measure the periods of the FG signal.

Differences from the control flow of FIG. 10 consist only in steps S1102 and S1107. A description of the other steps will thus be omitted. In step S1102, the CPU 401 instructs the motor driver 406 to reduce the output of the driving currents to the driving motor 301. In step S1107, after the measurement of the periods Td1, Td2, Td3, Td4, Td5, and Td6 of the FG signal, the CPU 401 instructs the motor driver 406 to increase the output of the driving currents to the driving motor 301 so that the rotation speed of the rotor approaches the target rotation speed.

As has been described above, according to the image forming apparatus 100 of the present exemplary embodiment, the magnitude or amount of noise occurring in the generated FG signal is suppressed. This enables accurate measurement of the periods of the FG signal.

An exemplary embodiment of the present invention can suppress a drop in the detection accuracy of the periods of the FG signal due to the supply of a driving current to the driving motor by stopping the supply of the driving current by the driving unit or reducing the output of the driving current from the driving unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-183172 filed Sep. 4, 2013, which is hereby incorporated by reference herein in its entirety.

What is claimed is:

1. An image forming apparatus comprising:
 a light source configured to emit a light beam for exposing a photosensitive member;
 a rotating polygonal mirror configured to deflect the light beam with a plurality of reflection surfaces so that the light beam scans the photosensitive member; and
 a driving device of the rotating polygonal mirror for rotating the rotating polygonal mirror, the driving device comprising:
  a driving motor configured to include a rotor to which the rotating polygonal mirror is fixed, a stator provided with a plurality of coils arranged at different positions in a rotation direction of the rotor, driving currents being supplied to the plurality of coils respectively, the driving currents causing the rotor to rotate, and a magnet that is attached to the rotor and in which a plurality of N poles and a plurality of S poles are alternately magnetized along a rotation direction of the rotor;
  a circuit board on which the driving motor is arranged;
  a detection element arranged on the circuit board and configured to detect a change of magnetic flux by rotation of the magnetic pattern of the magnet which rotates with a rotation of the rotor and output signal having a waveform which indicates the change of magnetic flux;
  a driving unit configured to supply the driving currents to the plurality of coils respectively and cause the rotor to rotate by switching supply of the driving currents to the plurality of coils respectively; and
  an acquisition unit configured to control the driving unit so the driving unit stops supplying the driving currents to the driving motor after the driving currents are being supplied to rotate the rotating polygonal mirror, and acquire a period of the detected waveform output from the detection element in the state where supply of the driving currents are stopped; and
  a storage unit configured to store period data for performing pattern matching with the period of the detected waveform acquired by the acquisition unit, the period data being associated with the plurality of reflection surfaces; and
  an identification unit configured to identify a reflection surface on which the light beam is incident among the plurality of reflection surfaces while the driving motor is rotating, based on a result of the pattern matching between the period of the detected waveform output by the detection element and the period data, the waveform is detected by the detection element in a period in which a rotation speed of the rotating polygonal mirror is reducing by stopping supplying the driving currents to the driving motor in the state where the driving currents are supplied.

2. The image forming apparatus according to claim 1, wherein the acquisition unit is configured to acquire the period of the detected waveform by controlling the driving unit so the driving unit stops supplying the driving currents in an acceleration period where the driving unit is supplying the driving currents to the driving motor to accelerate the rotating polygonal mirror to a target rotation speed.

3. The image forming apparatus according to claim 1, wherein the driving unit is configured to supply the driving currents to the driving motor again to accelerate the rotating polygonal mirror to the target rotation speed after stopping supplying the driving current in the acceleration period in which the driving unit is supplying the driving currents to the driving motor to accelerate the rotating polygonal mirror to the target rotation speed.

4. The image forming apparatus according to claim 1, wherein the acquisition unit is configured to convert the detected waveform output by the detection element into a pulse signal including a pulse corresponding to the period of the detected waveform, and acquire a plurality of periods of the detected waveform from a period of the pulse signal.

5. The image forming apparatus according to claim 4, further comprising:
 a memory unit configured to store pieces of correction data corresponding to the respective reflection surfaces; and
 a control unit configured to read correction data from the memory unit, the correction data corresponding to the reflection surface on which the light beam is incident based on an identification result of the identification unit, correct input image data by using the correction data, and control the light source based on the corrected input image data.

6. An image forming apparatus comprising:
 a light source configured to emit a light beam for exposing a photosensitive member;
 a rotating polygonal mirror configured to deflect the light beam with a plurality of reflection surfaces so that the light beam scans the photosensitive member; and
 a driving device of the rotating polygonal mirror for rotating the rotating polygonal mirror, the driving device comprising:
  a motor configured to include a rotor to which the rotating polygonal mirror is fixed, a stator provided with a plurality of coils arranged at different positions in a rotation direction of the rotor, driving currents being supplied to the plurality of coils respectively, the driving currents causing the rotor to rotate, and a magnet that is attached to the rotor and in which a plurality of N poles and a plurality of S poles are alternately magnetized along a rotation direction of the rotor;
  a circuit board on which the driving motor is arranged;
  a detection element arranged on the circuit board and configured to detect a change of magnetic flux by rotation of the magnetic pattern of the magnet which rotates with a rotation of the rotor and output signal having a waveform which indicates the change of magnetic flux;
  a driving unit configured to supply the driving currents to the plurality of coils respectively and cause the rotor to rotate by switching supply of the driving currents to the plurality of coils respectively; and an acquisition unit configured to control the driving unit so that the driving unit reduces outputs of the driving currents to the driving motor after the driving currents are supplied to rotate the rotating polygonal mirror, and acquire a period of the detected waveform output from the detection element in the state where the output of the driving currents are reduced; and a storage unit configured to store period data for performing pattern matching with the period of the detected waveform acquired by the acquisition unit, the period data being associated with the plurality of reflection surfaces; and an identification unit configured to identify a reflection surface on which the light beam is incident among the plurality of reflection surfaces while the driving motor is rotating, based on a result of the pattern matching between the period of the detected waveform output by the detection element and the period data, the waveform is detected by the detection element in a period in which a rotation speed of the rotating polygonal mirror is reducing by reducing the outputs of the driving currents to the driving motor in the state that the driving currents are supplied.

7. The image forming apparatus according to claim 6, wherein the acquisition unit is configured to acquire the period of the detected waveform by controlling the driving unit so that the driving unit reduces the outputs of the driving currents in an acceleration period where the driving unit is supplying the driving currents to the driving motor to accelerate the rotating polygonal mirror to a target rotation speed.

8. The image forming apparatus according to claim 7, wherein the driving unit is configured to increase the output of driving currents to the driving motor from the state where the outputs of the driving current are lowered to accelerate the rotating polygonal mirror to the target rotation speed after reducing the output of the driving currents of the driving unit in the acceleration period where the driving unit is supplying the driving currents to the driving motor to accelerate the rotating polygonal mirror to the target rotation speed.

* * * * *